Oct. 5, 1937.  T. THOMPSON  2,094,687
TRANSMISSION AND CONTROL MECHANISM FOR BICYCLES OR LIKE
Filed May 22, 1936

INVENTOR.
THOMAS THOMPSON
BY M. Talbert Dick
ATTORNEY.

Patented Oct. 5, 1937

2,094,687

UNITED STATES PATENT OFFICE 2,094,687

TRANSMISSION AND CONTROL MECHANISM FOR BICYCLES OR LIKE

Thomas Thompson, Des Moines, Iowa

Application May 22, 1936, Serial No. 81,279

8 Claims. (Cl. 192—5)

The principal object of my invention is to provide a clutch for bicycles and the like that will permit band hub brakes to be used and operated by a reverse pressure on the pedals of the bicycle.

A further object of my invention is to provide a clutch for bicycles and like vehicles that will eliminate the common coaster brake and which will allow the bicycle to be wheeled forward or backward without turning the pedals or applying the brakes.

A still further object of my invention is to provide a clutch for chain operated vehicles that is free wheeling, is compact, and which presents no protruding parts to interfere with the operation of the vehicle by the operator or user.

A still further object of my invention is to provide a clutch for bicycles and the like that will not allow any pressure or tautness to be applied on the lower, return side of the chain, thereby allowing the efficient and practical use of multiple speed gears.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

It is the common practice, in the manufacture of bicycles, to place a coaster brake in the hub of the rear wheel. This coaster brake provides the braking mechanism and permits the rider of the bicycle to coast without the pedals of the vehicle turning. This type of mechanism presents many disadvantages in that, due to the congestion of parts within the hub, many mechanical failures are experienced. Furthermore the braking surface provided within the hub is not adequate and only the rear wheel may be braked. Also when the bicycle is manually wheeled or pushed rearwardly the pedals of the vehicle will turn thereby catching the operator's clothes or even injuring the operator.

In operating the brake within the hub or coaster brake assembly the operator exerts a back pressure on the pedals. This tightens the lower part of the chain drive which operates the brake. Obviously this tightening of the lower part of the chain or reversal of pull on the chain, precludes the advantageous use of multiple speed gearing as it tends to straighten the chain over the sprocket gears pulling them out of alignment, shortening their useful life, and hampering the efficient operation and mechanical manipulation or shifting of these gears.

Furthermore, when it is desired to use hub brakes on both wheels of the bicycle an auxiliary operating means such as a hand operated lever or the like must be used. Thus the operator or rider of the bicycle must release his hold on the steering mechanism and manually apply the brakes.

I have overcome these disadvantages by providing a clutch and brake operating mechanism for bicycles and the like which may be incorporated into the drive sprocket assembly of a bicycle and which, regardless of the direction the bicycle is manually pushed, allows the pedals to remain stationary. Furthermore by the use of my clutch mechanism, external band brakes may be used on each wheel of the bicycle and may be operated by reversing the power application on the pedals operating the drive mechanism of the bicycle. My clutch mechanism is free wheeling, will not permit back pressure to be applied to the chain or other driving mechanism, and permits the advantageous use of multiple speed gears due to the elimination of the back pressure or reverse pull on the driving means.

Figure 4:
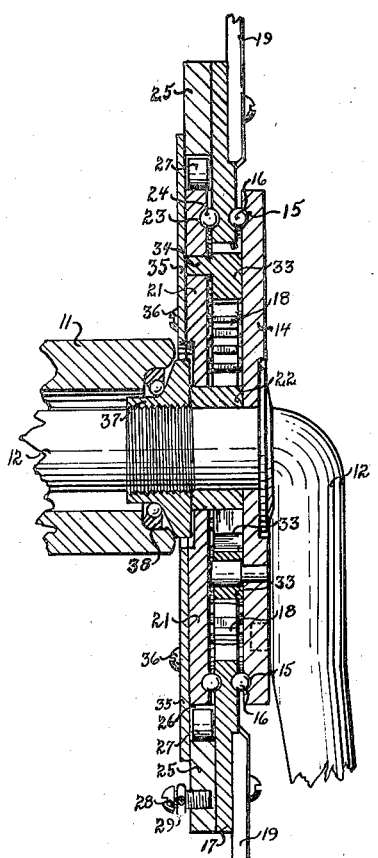
Fig. 4 is an enlarged cross sectional view of my complete device, mounted on a bicycle hanger and is taken on the line 4—4 of Fig. 3.

Referring to the drawing, I have used the numeral 10 to designate a common bicycle frame having the ordinary pedal bearing housing 11. The numeral 12 designates the ordinary double pedal lever rotatably mounted within the housing 11 and having each of its end portions bent in opposite directions at right angles to that portion with bearings within the housing 11. The numeral 13 indicates the common foot pedals rotatably secured to the lever 12 at each of its extremities and extending outwardly and at right angles to each arm of the lever. I have used the numeral 14 to designate the transmission disk of my clutch. This disk 14 is secured by means of a flange and a drive lug, (shown in Fig. 4 of the drawing by dotted lines), to the lever 12 adjacent one of the arms of the lever and has its peripheral face parallel to the surface of the bearinged portion of the lever 12 as shown in the drawing. Cut in the inside face of the disk 14 adjacent and parallel to its peripheral edge is a ball race 15, designed to accommodate a plurality of ball bearings 16 as shown. The numeral 17 designates the sprocket drive ring of my device, rotatably mounted adjacent the disk 14 by having cut in its face a ball race capable of receiving and retaining the ball bearings 16 as shown in Fig. 4 of the drawing. Cut about the inner peripheral edge of the ring 17 are a plurality of ratchet teeth which are designated by the numeral 18.

The ring 17 has a substantially greater outside diameter than the disk 14 and has suitably and rigidly secured to this additional margin a common sprocket wheel 19 which is in operative engagement with a common drive chain 20 which ordinarily drives the rear wheel of a bicycle or like. The numeral 21 designates a clutch disk rotatably mounted on a sleeve bearing 22 about the bearinged portion of the lever 12 and having a ball race 23 cut in its inner face near its peripheral edge for receiving the ball bearings 24 which are in engagement with a similar race cut in the ring 17. By the foregoing it is obvious that the ring 17 is held in position with relation to the disks 14 and 21 by the ball bearings 16 and 24 which are supported in alignment by the races 15 and 23 and the corresponding races cut on each face of the ring 17, thereby making the ring 17 rotatably independent of the disks 14 and 21.

Figure 3:
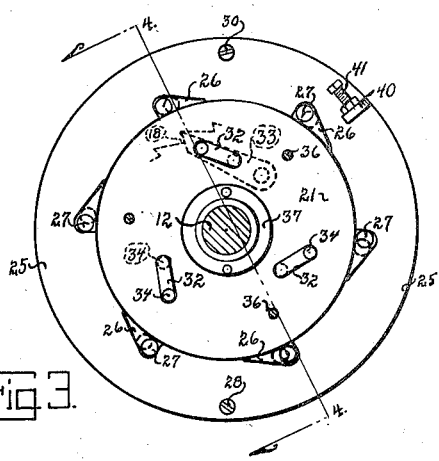
Fig. 3 is an enlarged plan view of the device with the cover plate removed and showing the relative position of all operating parts.
Figure 5:
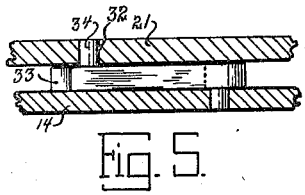
Fig. 5 is an enlarged cross section of a portion of my device illustrating the position of the ratchet pawls.

The numeral 25 indicates a brake plate rotatably mounted on the peripheral edge of the disk 21, of the same approximate thickness as the disk 21 and in continuation of its plane. The numeral 26 designates a plurality of overrunning clutch recesses cut in the inner peripheral edge of the plate 25 and capable of operatively containing and engaging rollers 27 in conjunction with the peripheral surface of the disk 21 as shown in Fig. 3 of the drawing.

The numeral 28 designates a bolt or like rigidly secured near the outer marginal edge of the plate 25, to which is secured the operating rod or wire of the ordinary flexible control 29 which may be in operative engagement with the ordinary type of expanding hub brake on the rear wheel of the bicycle.

The numeral 30 designates a second bolt or like rigidly secured near the upper marginal edge of the plate 25 and diametrically opposite the bolt or like 28 for securing one end of the flexible control 31. This flexible control has its other end in operative engagement with an expanding hub brake on the front wheel of the bicycle.

The numeral 32 designates several slots cut in the clutch disk 21 and on a diagonal to the arc of rotation of the disk. Rotatably mounted near one of their ends to the transmission disk 14 are several ratchet pawls 33. These pawls 33 extend diagonally outward from near the center and have their outer ends designed to engage the ratchet teeth 18 of the plate 17. The numeral 34 indicates pawl operating lugs integrally formed on the forward ends of the pawls 33 and in operative engagement with the diagonal slots 32 cut in the plate 21. The numeral 35 designates a cover plate secured to the plate 21 by bolts or like 36. This plate extends beyond the peripheral edge of the plate 21 so as to form a retainer for the rollers 27, holding them in alignment.

The numeral 37 designates a retaining nut threaded onto the horizontal bearinged portion of the lever 11 and contacting the end of the bearing sleeve 22.

The numeral 38 designates a ball bearing member interposed between the housing 11 and the nut 37. The nut 37 acts as a bearing support and serves to retain the clutch mechanism by tightening against the end of the sleeve 22 which protrudes slightly beyond the face of the disk 21 so that that disk may rotate freely.

The numeral 39 indicates an assembly and holding nut threaded onto the end of the horizontal bearinged portion of the lever 12 at the opposite end of the housing 11 from the clutch mechanism and serves to hold the lever 12 in position within the housing 11.

The numeral 40 designates a brake stop rigidly formed on the plate 25 and extending inwardly and at right angles thereto. The numeral 41 indicates an adjusting screw threaded into the outer end of the brake stop 40 and capable of contacting the frame 10 when the plate 25 is rotated to the rear the desired distance. When reverse pressure is applied to the pedals 17 for operating the braking mechanism it is desirable to have some means of operatively stopping the brake operating mechanism so that the cables or control rods will not be broken by exerting too much pressure. By the use of the adjusting screw the tension or power applied to the brakes can be adjusted so as to be sufficient for the operation of the brake but which will form a positive stop to prevent breakage of the brake controlling member.

The practical operation of my device is as follows: The clutch is assembled in place on the bicycle as shown. When forward power is applied to the pedals 13 the disk 14 will be rotated in the same direction, thereby moving the ratchet pawls 33 and pulling the lugs 34 outwardly, guided by the diagonal slots 32, thereby bringing the pawls into engagement with the ratchet teeth. This action causes the plate 17 to rotate, transmitting the power to the sprocket gear 19, secured to the plate 17 and thereby operating the chain 20 for actuating the rear wheel of the bicycle. During this operation the ring 25 will remain stationary, being held by the brake operating controls 29 and 31.

When the bicycle is in motion and it is desired by the operator, to coast or free wheel, he will merely stop the application of power to the pedals. The disk 14 will stop or slow down, the disk 21 will continue to rotate forwardly by its own momentum thereby drawing the lugs 34 inwardly within the diagonal slots, stopping the disk 21 from further rotation when the lugs 34 contact the inner end of the slots, and bringing the pawls 33 out of engagement with the ratchet teeth 18, thereby allowing the plate 17 and its attendant sprocket gear to rotate freely.

Figure 1:
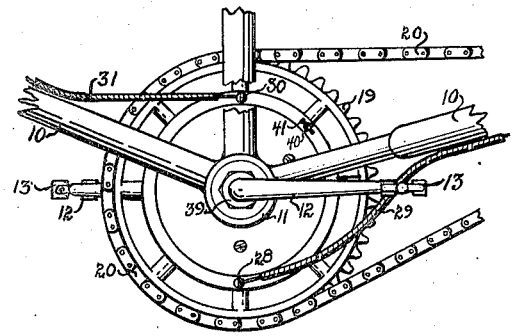
Fig. 1 is a plan view of a portion of a bicycle showing my device installed and ready for use.
Figure 2:
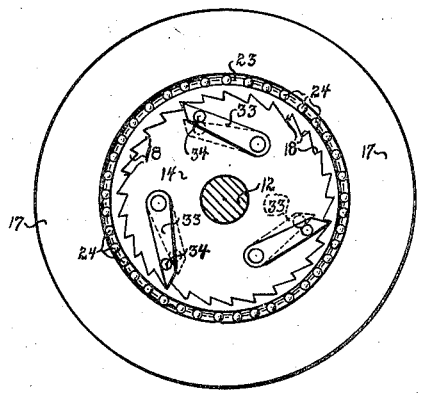
Fig. 2 is an enlarged plan view of my device with the cover plate, clutch plate, and brake ring removed showing the ratchet and ratchet pawls.

When it is desired to apply the brakes it is necessary to exert a reverse force on the pedals thereby rotating the disk 14 to the rear which will pull the disk 21 to the rear by virtue of the connecting link formed by the pawls 35 and their attendant lugs 34 which engage the disk 21, and pulling the rollers 27 to the rear and jamming them between the sloping sides of the recesses 26 and the peripheral edge of the plate 21 and moving the ring 25 to the rear. The control rods or cables 29 and 31, being secured to this ring 25 by means of the bolts or like 28 and 30 respectively, will be actuated and consequently suitable brakes connected to the other ends of the rods or cables 29 and 31 will be actuated. This action does not effect the rotation of the plate 17 as it is free to rotate thereby eliminating the possibility of any reverse pull on the chain 20. Whenever power is not being applied to the pedals 13 and the lever 12 the pawls 33 will be out of engagement with the ratchet teeth 18 as shown by dotted lines in Fig. 2 of the drawing. These pawls are pulled to this position by virtue of the disk 21 being carried forward by its own momentum, when the applied power has ceased, causing the lugs 34 to be pulled to the more central ends of the slots 32. This position of the lugs is shown by dotted lines in Fig. 3 of the drawing.

The operation of the disk 21 in pulling the pawls 33 out of engagement with the ratchet teeth or placing them in engagement with the ratchet teeth is further aided by the friction occurring through the bearings 16 and 24 within the races 15 and 23, thus providing quick, positive action in the transmission of power through the pawls 33, ratchet teeth 18 of the plate 17 to the sprocket gear and its attendant mechanism.

The above action frees the mechanism so that the plate 17 with its attendant sprocket gear 19 and chain 20 may be rotated in either direction without moving the rest of the clutch mechanism or the lever 12.

From the foregoing it will be seen that I have provided a transmission and clutch that is free wheeling in both directions of travel, does not allow back pressure to be applied to the chain or other driving mechanism, allows for the operation of hub brakes by reverse pressure on the pedals, is quiet and positive in operation and which may be used to great advantage to drive gear trains or multiple speed gears.

My improved type mechanism can be efficiently used either in communication with a free wheel rear sprocket or without a free wheeling rear sprocket.

While I have described the operation of my device in conjunction with a bicycle it may be used in any type of drive where it is desired to have the mechanism being powered, rotate freely in either direction without having this motion transmitted to the prime mover, that will operate a control by reverse power being applied by the prime mover, and that will confine the pressure of transmission to one direction.

My device may be used to great advantage on all types of powered mechanisms such as lathes, conveyors, vehicles, hoists and in fact any mechanism requiring only one direction of travel.

Some changes may be made in the construction and arrangement of my improved clutch and control device for bicycles and like without departing from the real spirit and purpose of my invention and it is my intention to cover by my claims any modified forms of structure or use of mechanical equivalents which may be reasonably included within their scope.

I claim:

1. In a bicycle drive mechanism, a foot operated pedal lever, an engaging member mounted on said pedal lever capable of operatively engaging said drive mechanism, a means for locking said pedal lever to said engaging member when said pedal lever is rotated in its driving direction, a brake control member mounted on said pedal lever designed to be in operative engagement with bicycle hub brakes, a means for locking said brake control member to said pedal lever when said pedal lever is rotated in a counterdrive direction for operating said brakes, and a means for limiting the rotation of said lever and said brake control member after said brakes have been operated.

2. In a device of the class described, a shaft, a disk secured to said shaft, a second disk rotatably mounted on said shaft and spaced apart from said first disk, a ring rotatably supported between said disks, a means for operatively connecting said ring to said first mentioned disk when said disk is moved in one direction, a brake operating plate rotatably mounted on said second mentioned disk capable of rotation in one direction with respect to the rotation of said second mentioned disk, and a means for operatively connecting said first mentioned disk to said second mentioned disk.

3. In a clutch mechanism, a shaft, a disk secured to said shaft, a transmission ring rotatably mounted on said disk, a plurality of ratchet teeth cut on the inner edge of said ring, a second disk rotatably mounted on said shaft, said first mentioned disk and said second mentioned disk being on either side of and supporting said ring, a diagonal slot cut in said second mentioned disk, a ratchet pawl rotatably secured to said first mentioned disk, a lug on said pawl engaging said slot, said pawl engaging said ratchet teeth when said second mentioned disk is moved in one direction, a clutch plate rotatably mounted on said second mentioned disk, and a means for stopping the rotation of said plate in one direction of rotation with respect to said second mentioned disk.

4. In combination with a vehicle having a driving mechanism capable of operation in one direction of rotation, a shaft, a plate secured to said shaft and operating with said shaft, a ring mounted on said plate, a means for locking said ring to said plate when said plate is being rotated in one direction, a means for operatively engaging said ring to said driving mechanism, a disk rotatably mounted on said shaft, a means for limiting the relative rotary movement between said plate and said disk, a control operating member mounted on said disk rotatably independent of said disk when said mechanism is being powered, and a means for locking said control member to said disk when said prime mover is reversed.

5. In a clutch mechanism, a shaft, a disk secured to said shaft, a ring rotatably mounted on said disk, ratchet teeth cut on the inner peripheral edge of said ring, a second disk rotatably mounted on said shaft and bearinged against said ring, said ring being positioned between said first mentioned and said second mentioned disks, slots in said second mentioned disk cut diagonally to its arc of rotation, a plurality of ratchet pawls rotatably mounted to said first mentioned disk, lugs on said pawls engaging said slots, said pawls capable of engaging said ratchet teeth at times, an overrunning clutch plate rotatably mounted on the outside peripheral edge of said second mentioned disk, a means for preventing the rotation of said plate relative to said disk when said disk is rotated in one direction, and a means for holding said complete assembly in respective alignment.

6. In combination with a bicycle comprising a frame, front and rear wheels, chain drive, external hub brakes on each wheel and a pedal shaft; a disk rigidly secured to said pedal shaft, a second disk rotatably mounted on said shaft and spaced apart from said first mentioned disk, a ring rotatably supported between said first mentioned disk and said second mentioned disk, said ring having secured to its marginal edge a sprocket gear for driving the chain of said bicycle, ratchet teeth cut in said ring, ratchet pawls supported between said first mentioned disk and said second mentioned disk, a means for bringing said pawls into engagement with said ratchet teeth when said pedals are rotated in a forward direction, a means for bringing said pawls out of engagement with said teeth when said pedals are not being rotated, a brake operating ring rotatably mounted on said second mentioned disk, a means for operatively connecting said first mentioned disk to said second mentioned disk, a means for preventing the rotation of said brake operating ring with respect to said second mentioned disk when said pedals are rotated in a rearward direction, control members each having one end secured to said brake operating ring and their other ends in operative engagement with said hub brakes, said brakes being operated when power is applied to said pedals in a rearward direction of rotation, and an adjustable stop member rigidly secured to said brake operating plate for limiting the rearward rotation of said plate after said brakes have been operated.

7. In a bicycle drive mechanism, a foot operated pedal lever, an engaging member capable of operatively engaging said drive mechanism, a means for locking said pedal lever to said engaging member when said pedal lever is rotated in its driving direction, a brake control member designed to be in operative connection with a bicycle hub brake, a means for locking said brake control member to said pedal lever when said pedal lever is rotated in a counterdrive direction for operating said brake, and a means for limiting the rotation of said pedal lever after said brakes have been operated.

8. In combination with a bicycle having rear and front wheels, a pedal shaft assembly including a pedal lever and a sprocket gear, a braking mechanism for one of its wheels, a transmission and control mechanism comprising, a means for connecting said pedal lever to said sprocket gear when the same is rotated in its driving direction faster than the rate of rotation of the sprocket gear in the same direction, a means for connecting said pedal lever to said braking mechanism when the same is rotated in the opposite direction, and a means for limiting the rotation of said pedal lever in said opposite direction; said transmission and control mechanism remaining in neutral when said pedal lever is not actuated in either direction, thereby permitting said sprocket gear at such time to freely rotate in either direction without moving said pedal lever.

THOMAS THOMPSON.